(12) United States Patent
Kuhlmann

(10) Patent No.: US 11,447,225 B2
(45) Date of Patent: Sep. 20, 2022

(54) RUDDER FOR WATERCRAFT WITH A BEARING CLEARANCE MEASURING DEVICE, METHOD FOR MEASUREMENT OF A BEARING CLEARANCE IN A RUDDER AND BEARING CLEARANCE MEASURING DEVICE FOR A RUDDER

(71) Applicant: Becker Marine Systems GmbH, Hamburg (DE)

(72) Inventor: Henning Kuhlmann, Hamburg (DE)

(73) Assignee: Becker Marine Systems GmbH, Hamburg (DE)

( * ) Notice: Subject to any disclaimer, the term of this patent is extended or adjusted under 35 U.S.C. 154(b) by 435 days.

(21) Appl. No.: 16/814,246

(22) Filed: Mar. 10, 2020

(65) Prior Publication Data
US 2020/0290715 A1     Sep. 17, 2020

(30) Foreign Application Priority Data

Mar. 13, 2019  (EP) .................................. 19162575
Feb. 28, 2020  (EP) .................................. 20160036

(51) Int. Cl.
*G01B 17/02* (2006.01)
*B63H 25/38* (2006.01)
*G01B 7/14* (2006.01)

(52) U.S. Cl.
CPC ............ *B63H 25/38* (2013.01); *G01B 7/144* (2013.01); *G01B 17/02* (2013.01)

(58) Field of Classification Search
CPC ......... G01B 7/144; G01B 17/02; G01B 17/14
USPC .......................................................... 33/645
See application file for complete search history.

(56) References Cited

U.S. PATENT DOCUMENTS

| | | | | |
|---|---|---|---|---|
| 4,199,718 | A * | 4/1980 | Ikeda | G01B 7/144 340/682 |
| 4,924,180 | A * | 5/1990 | Nasr | G01M 13/04 73/66 |
| 5,001,435 | A * | 3/1991 | Smith | G01B 7/144 324/683 |
| 5,300,841 | A * | 4/1994 | Preston | G01B 7/144 324/207.13 |
| 5,300,842 | A * | 4/1994 | Lyons | G01B 7/144 324/207.13 |
| 6,398,156 | B2 * | 6/2002 | Hetzer | F42B 10/64 244/3.28 |
| 6,471,407 | B1 * | 10/2002 | Katano | G01B 7/144 384/624 |
| 10,066,662 | B2 * | 9/2018 | Kuhlmann | G01B 7/144 |
| 10,234,375 | B2 * | 3/2019 | Abdellatif | B63G 8/001 |
| 10,989,529 | B2 * | 4/2021 | Abdellatif | B63G 8/001 |
| 11,054,253 | B2 * | 7/2021 | Sasano | G01B 21/16 |

FOREIGN PATENT DOCUMENTS

| | | |
|---|---|---|
| WO | 2011/117301 A1 | 9/2011 |
| WO | 2015/150266 A1 | 10/2015 |

* cited by examiner

*Primary Examiner* — George B Bennett
(74) *Attorney, Agent, or Firm* — Kelly & Kelley, LLP

(57) ABSTRACT

A rudder for watercraft, in particular for ships, is proposed, comprising a rudder shaft arranged in a trunk pipe, a rudder blade connected to the rudder shaft and a bearing bushing arranged between trunk pipe and rudder shaft as well as a bearing clearance measuring device, wherein the bearing clearance measuring device comprises at least one sensor for abrasion-free measurement of a bearing clearance.

14 Claims, 11 Drawing Sheets

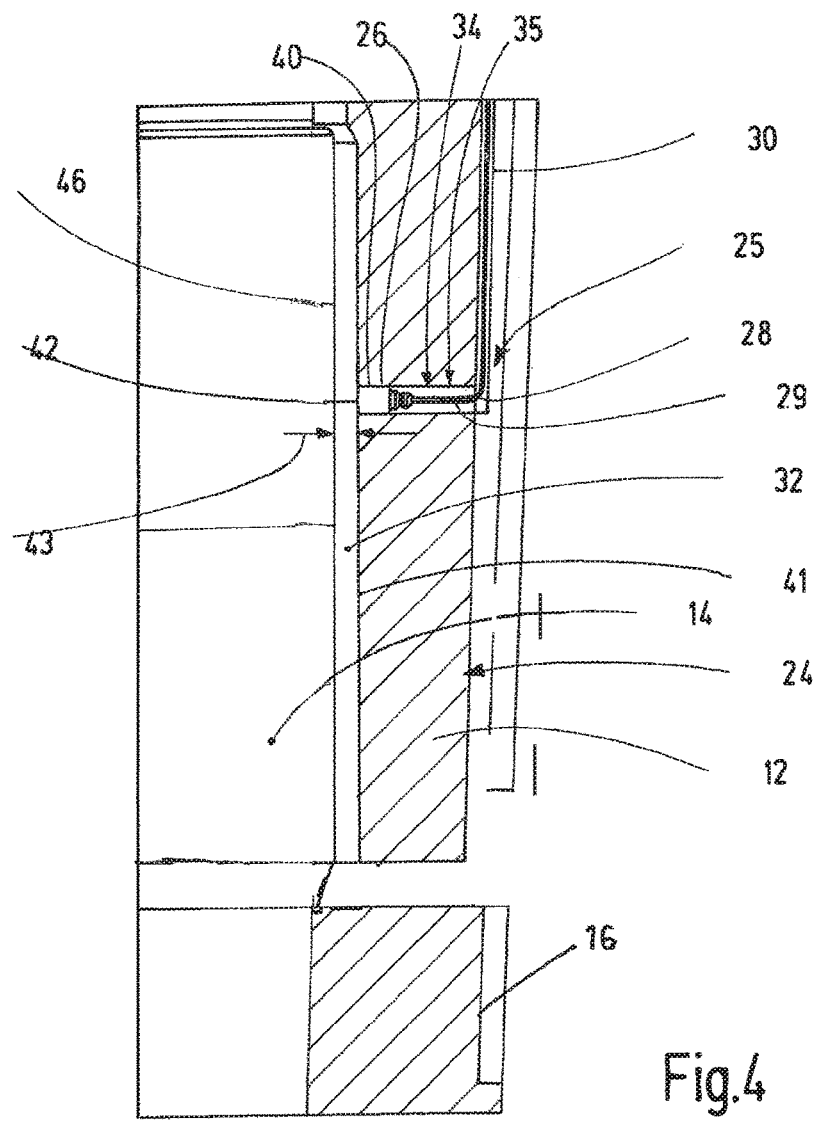
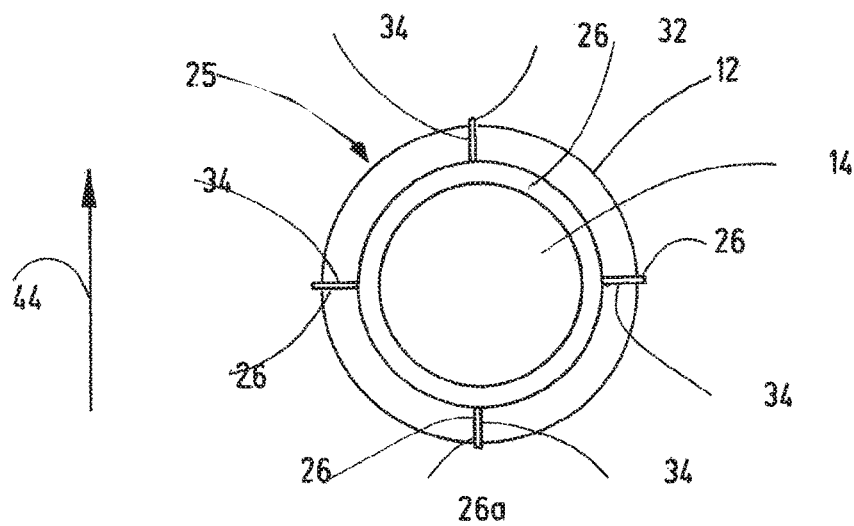

RUDDER FOR WATERCRAFT WITH A BEARING CLEARANCE MEASURING DEVICE, METHOD FOR MEASUREMENT OF A BEARING CLEARANCE IN A RUDDER AND BEARING CLEARANCE MEASURING DEVICE FOR A RUDDER

The present invention relates to a rudder for watercraft, in particular for ships, comprising a rudder shaft arranged in a trunk pipe, a rudder blade connected to the rudder shaft, a bearing bushing arranged between trunk pipe and rudder shaft and a bearing clearance measuring device. The present invention further relates to a method for measuring a bearing clearance in a rudder and a bearing clearance measuring device for a rudder.

TECHNOLOGICAL BACKGROUND

Rudders for watercraft, in particular for ships, comprise a rudder blade fastened to a rudder shaft. The rudder shaft is usually guided rotatably about the rudder shaft axis in a trunk pipe arranged on the stern of the ship. At least one bearing bushing is provided for mounting the bearing shaft in the trunk pipe, which bearing bushing is preferably arranged in the region of the lower end of the trunk pipe.

As a result of the large forces which occur during operation, the bearing bushing is subjected to severe wear which can result in damage to the rudder or even in failure of the complete rudder system. The bearing clearance caused by the wear, that is the play of the rudder in the bearing bushing or in the trunk pipe must be regularly measured for this reason. In the prior art, the measurement of the bearing clearance is usually carried out manually by qualified divers under water on the port or on the starboard side of the rudder.

A rudder for ships is known from WO 2011/117301 A1. The rudder comprises a bearing for mounting a rudder blade or a rudder shaft on the hull. The bearing comprises an inner bearing section and an outer bearing section which rests slidingly on the inner bearing section. Furthermore a wear pin is provided which is arranged on the outer bearing section or on the inner bearing section and furthermore rests slidingly on the other of the inner bearing section and outer bearing section.

Known from WO 2015/150266 A1 of the applicant is an electronic bearing clearance measuring device for a rudder which has a measurement-value sensor with a wear surface. The measurement-value sensor with the wear surface is in a sliding contact with a bearing element of a bearing. The measurement-value sensor is not configured to be pin-shaped.

DESCRIPTION OF THE INVENTION: OBJECT, SOLUTION, ADVANTAGES

It is the object of the present invention to provide a rudder for water-craft, in particular for ships, with a low-maintenance bearing clearance measuring device by means of which a cost-effective and preferably automatic measurement of a bearing clearance is possible, wherein the measurement directly yields the relevant measured values for a quantification of the bearing clearance. Furthermore, it is the object of the present invention to provide a method for measurement of a bearing clearance in a rudder and a bearing clearance measuring device for a rudder, by means of which the aforesaid advantages are achieved.

In order to achieve the object forming the basis of the invention, a rudder for watercraft, in particular for ships, is proposed, comprising a rudder shaft arranged in a trunk pipe, a rudder blade connected to the rudder shaft and a bearing bushing arranged between trunk pipe and rudder shaft, wherein furthermore a bearing clearance measuring device is provided which comprises at least one sensor for abrasion-free measurement of a bearing clearance.

The rudder for watercraft is configured in particular for large shipslike passenger ships, container ships, tankers, bulkers or ferries.

In a watercraft with a rudder, the rudder blade of the rudder is usually fastened to a rudder shaft of the rudder. The rudder shaft is connected rotatably to the watercraft by means of a rudder system arranged in the hull of the watercraft. For receiving rudder forces which occur during operation, the rudder shaft can be guided in a trunk pipe which projects downwards from the hull of the watercraft. In this case, the rudder shaft is mounted rotatably in the trunk pipe with bearings, in particular with neck bearings. The bearing has at least one bearing bushing which is arranged either on the bearing shaft or on the trunk pipe. The bearing bushing can be arranged on the inside and non-rotatably in the trunk pipe. The rudder shaft or another bearing bushing fastened to the rudder shaft is in sliding contact with the bearing bushing arranged in the trunk pipe. Alternatively or additionally, a bearing bushing can also be arranged on an outer side of the trunk pipe. In this case, the rudder via the rudder blade is mounted on the outside on the bearing bushing on the trunk pipe, wherein a further bearing bushing can be provided on the rudder blade, which is in sliding contact with the bearing bushing arranged on the outer side of the trunk pipe.

The present invention is suitable for all the aforesaid configurations and arrangements of the bearing or the bearing bushings.

A further solution of the object forming the basis of the invention therefore also consists in providing a rudder for watercraft, in particular for ships, comprising a rudder shaft arranged in a trunk pipe, a rudder blade connected to the rudder shaft and a bearing bushing arranged between trunk pipe and rudder blade as well as a bearing clearance measuring device, wherein the bearing clearance measuring device comprises at least one sensor for abrasion-free measurement of a bearing clearance.

Within the scope of the present invention, an abrasion-free measurement of a bearing clearance is understood as a measurement in which the sensor is substantially subject to no abrasion. The terms "wear-free" and "wear" can also be used synonymously with the terms "abrasion-free" and "abrasion". Since the sensor is not exposed to any abrasion or wear, the bearing clearance measuring device is particularly maintenance-free. A bearing clearance is understood as an, in particular radial play of the bearing shaft in the trunk pipe or in the bearing bushing.

The forces acting on the rudder during operation can result in some wear of the bearing bushing. This wear of the bearing bushing has the result that the rudder shaft in the trunk pipe or the rudder blade on the trunk pipe can swing out in a radial direction in addition to a rotation about the axis of the rudder shaft, which can result in damage to the trunk pipe, the rudder, the rudder shaft or the rudder system.

By means of the bearing clearance measuring device comprising a sensor for abrasion-free measurement of a bearing clearance, it can be determined in good time when bearing clearance is present so that measures to prevent any damage can then be taken. For example, the bearing or the bearing bushing can be renewed. In addition, due to the measurement of bearing clearance by means of a sensor for abrasion-free measuring of a bearing clearance, manual measurements performed by qualified divers under water can be largely dispensed with. Since manual measurements cannot be performed at each time point, the measurement of bearing clearance by means of a sensor for abrasion-free measuring of a bearing clearance enables a continuous and therefore particularly timely measurement of the bearing clearance.

It is preferably provided that the at least one sensor for abrasion-free measurement of a bearing clearance is a sensor for abrasion-free measurement of a distance between the sensor and the rudder shaft and/or for abrasion-free measurement of a wall thickness of the bearing bushing.

As a result of the measurement of a distance between the sensor and the rudder shaft and/or measurement of a wall thickness of the bearing bushing, those measured values which are relevant for a quantification of the bearing clearance are determined directly by the bearing clearance measuring device. In contrast to this, in the prior art the bearing clearance is determined by means of auxiliary measured values. A known auxiliary measured value is the abrasion of a sensor for measurement of bearing clearance from which the bearing clearance is then derived.

As a result of the direct measurement of the distance or the wall thickness, the measurement of the bearing clearance is more precise and less prone to error.

It is particularly advantageously provided that the at least one sensor is arranged in a contact-free manner and at a distance from the rudder shaft.

The at least one sensor is therefore not arranged in physical contact with the rudder shaft guided rotatably in the trunk pipe. Since there is no physical contact between the sensor and the rudder shaft, the sensor also undergoes no abrasion. The sensor is in particular arranged at a distance of at least 10 mm, preferably at a distance of at least 30 mm, further preferably at a distance of at least 40 mm, particularly preferably at a distance of at least 50 mm, from the rudder shaft.

Bearing bushings for rudders for watercraft usually have a wall thickness between 10 mm and 50 mm. Accordingly an advantage of an arrangement of the sensor at a distance from the rudder shaft is that the bearing bushing can be arranged between the sensor and the rudder shaft.

It is preferably provided that the sensor is arranged on an outer side of the bearing bushing.

The sensor is particularly preferably arranged in contact with the outer side of the bearing bushing. The bearing bushing is furthermore particularly advantageously arranged in a fixed manner in or on the trunk pipe, that is, the bearing bushing does not run with the rudder shaft or the rudder. In the arrangement of the at least one sensor on the outer side of the in particular fixed bearing bushing, the sensor can be in contact with the bearing bushing without any abrasion of the sensor coming about.

It can further advantageously be provided that the at least one sensor is arranged above or below the bearing bushing when viewed in an axial direction of the rudder shaft.

If the at least one sensor is arranged above or below the bearing bushing, in particular a completely contact-free measurement of the bearing clearance is possible. The sensor is in particular neither in contact with the rudder shaft nor with the bearing bushing. The contact-free measurement however does not exclude the fact that seawater, contact means or lubricant such as grease are arranged between the sensor and the bearing bushing.

It is particularly advantageous if at least two, preferably at least three, particularly preferably at least four sensors are provided, wherein the sensors are arranged in particular at regular angular spacings over a circumference of the trunk pipe and/or the bearing bushing.

As a result of the arrangement of a plurality of sensors, a more precise measurement of the bearing clearance can be made. Since the wear of the bearing bushing is usually not distributed uniformly over the circumference, a measurement at at least two, preferably at least three, particularly preferably at least four positions over the circumference of the bearing bushing is particularly advantageous. For this purpose the sensors are preferably arranged over the circumference of the trunk pipe. If three sensors are provided, the angular distance between the sensors is preferably 120°. With four sensors the angular distance is preferably 90°.

Particularly preferably it is provided that the at least two preferably at least three, particularly preferably at least four sensors are arranged at the same height when viewed in the axial direction of the rudder shaft.

It can further advantageously be provided that the at least one sensor, in particular at least one of the sensors is arranged in an aft region of the in particular fixed trunk pipe.

The trunk pipe is usually firmly connected to the hull of the watercraft and not rotatably mounted. Since during normal forwards travel of the watercraft, the rudder forces on the rudder act particularly strongly contrary to the direction of travel towards the rear in the aft direction, the greatest wear of the bearing bushing should be expected in the aft-side region of the bearing bushing. For this reason, it is particularly advantageous if at least one of the sensors is arranged in the aft-side region, in particular exactly aftwards. If further sensors are provided, in the case of four sensors, for example, respectively two sensors are arranged exactly abeam, that is at 90° to the longitudinal axis of the watercraft whereas a fourth sensor is arranged exactly on the longitudinal axis in the forward direction or in the bow direction.

Preferably it can be provided that the at least one sensor is arranged in a sensor receptacle, in particular in a drill hole, of the trunk pipe and is preferably is screwed in or to the trunk pipe.

For attachment of the at least one sensor, a sensor receptacle can thus be provided on the trunk pipe. The sensor receptacle can, for example, be a drill hole set into the trunk pipe after fabrication of the trunk pipe, preferably having an internal thread. The at least one sensor is then expediently introduced into the sensor receptacle from the outer side of the trunk pipe and fastened there. For fastening the sensor this can be screwed directly in the drill hole. However, other fastening means such as adhesives, resins or further screw connections can also be provided.

It is particularly advantageously provided that the at least one sensor is an eddy current sensor or an ultrasound sensor.

In this case, it is particularly preferable that the sensor is an eddy current sensor.

With an eddy current sensor it is possible to make an inductive measurement of the bearing clearance. The effect used by the eddy current sensor is based on a withdrawal of energy from a resonant circuit. The eddy current sensor therefore preferably comprises a coil which can be fed with alternating current. When alternating current is fed to the coil, a magnetic field is formed in the coil. In the rudder shaft usually made of stainless steel, located in the vicinity of the eddy current sensor, an eddy current is then formed according to the Faraday induction law which in turn forms a magnetic field. This induced magnetic field counteracts the field of the coil which brings about a change in the coil impedance. The impedance can be measured as a change in the amplitude and phase position of the coil of the sensor and tapped as a measurable quantity. The distance of the eddy current sensor from the rudder shaft can be determined from the change in the amplitude and the phase position.

In particular if the at least one sensor is configured as an eddy current sensor, it is advantageous if the sensor is arranged above or below the bearing bushing when viewed in the axial direction of the rudder shaft. This enables a contact-free measurement of the distance from sensor to rudder shaft. Advantageously, the bearing bushing is not arranged between the eddy current sensor and the rudder shaft so that the material of the bearing bushing cannot disadvantageously influence the distance measurement.

Preferably the eddy current sensor is arranged at a minimum distance of at least 5 mm, further preferably of at least 10 mm, quite particularly preferably of at least 20 mm, above or below the bearing bushing.

Optionally materials located between the eddy current sensor and the rudder shaft such as water, air, lubricant, in particular grease, do not disadvantageously influence the distance measurement.

The measurement of the distance between the rudder shaft and the sensor, in particular the eddy current sensor, is an abrasion-free and contact-free measurement of the bearing clearance.

Alternatively or additionally, at least one of the sensors can also be configured as an ultrasound sensor. The ultrasound sensor is preferably arranged in direct contact with the further preferably fixed bearing bushing. By emitting and receiving ultrasound waves, the wall thickness of the bearing bushing in the region of the ultrasound sensor can be determined directly. Fundamentally it is also possible to make a contact-free measurement with an ultrasound sensor. In this case, in the contact-free measurement the ultrasound sensor is not in direct physical contact with the bearing bushing and/or with the rudder shaft. The ultrasound sensor can also be arranged above or below the bearing bushing on the trunk pipe so that the distance from the rudder shaft is determined by means of the ultrasound waves emitted and received by the ultrasound sensor. The ultrasound waves are reflected in return at the rudder shaft.

A contact-free measurement using ultrasound sensors is then particularly preferred if the wall thickness of the bearing bushing is to be determined but the bearing bushing is not fastened on the trunk pipe but on the rudder shaft and therefore turns with the rudder shaft in the trunk pipe.

It is further preferably provided that an ultrasound contact means, in particular silicone-based, is arranged between the ultrasound sensor and the bearing bushing and/or the rudder shaft.

The measurement by the ultrasound sensor is improved by the provision of a contact means.

Furthermore, in the case of a non-fixed bearing bushing, that is a bearing bushing which turns with the rudder shaft, a direct physical contact between the ultrasound sensor and the bearing bushing and/or the rudder shaft can be avoided due to the contact means arranged between the ultrasound sensor and the bearing bushing so that it is possible to make an abrasion-free measurement of the distance between sensor and rudder shaft or the wall thickness of the bearing bushing.

It can further preferably be provided that the at least one sensor is arranged on a holder, wherein the holder is fastened to the trunk pipe, in particular to a front side of the trunk pipe.

As a result of the fastening of the at least one sensor on a holder, a retrofitting solution is provided for existing rudders. Thus, an already existing rudder can be retrofitted with a holder having the at least one sensor in order to enable an abrasion-free measurement of the bearing clearance even in existing rudders.

Preferably the holder is a milled component.

The holder can thus be produced using means and methods known from the prior art and in particular can be produced cost-effectively. The holder can be introduced into the interior of the trunk pipe and fastened there, for example above or below the bearing bushing. However, it is also possible that the holder is set on a front side of the lower end of the trunk pipe projecting from the hull of the watercraft so that the sensor fastened to the holder measures the distance from the region of the rudder shaft projecting from the trunk pipe to the sensor.

Preferably the holder is configured to be annular.

It can further advantageously be provided that the holder comprises at least one ring segment. The at least one ring segment preferably covers an angular region of at least 90°, further preferably of at least 120°, even further preferably of at least 180°, quite particularly of 360°. In other words, the at least one ring segment is, for example, a quarter ring, a third ring, a half ring or a full ring. Furthermore, the holder can comprise more than one ring segment. If the plurality of ring segments are arranged in a plane, it is preferably provided that the plurality of ring segments together cover at most an angular region of 360°. For example, the holder comprises two ring segments configured as quarter rings.

Preferably a ring segment configured as a quarter ring covers somewhat more than 90°, for example, about 95° or 100°. By this means, it can be achieved that on a ring segment configured as a quarter ring, two sensors can be arranged at an angular distance of 90°. If the holder comprises two such ring segments configured as a quarter ring, these can be arranged above or below the bearing bushing so that a total of four sensors are arranged at regular angular distances of 90° around the rudder shaft.

A holder comprising two ring segments configured as quarter rings is particularly suitable for a retrofitting solution for existing rudders. However, a holder for a retrofitting solution can also comprise only one quarter ring or a full ring.

A holder comprising at least one ring segment which is not configured as a full ring is also advantageous with regard to maintenance. In the case of a defective sensor, in this case only the ring segment which has the defective sensor must be replaced. It can further be provided that the holder only comprises one ring segment, for example, a ring segment configured as a quarter ring. Such a holder is particularly advantageous when the abrasion-free measurement of the bearing clearance is only to be accomplished on one side or one region of the bearing. For example, it can be provided that the abrasion-free measurement of the bearing clearance should only be carried out in an aftward region of the bearing.

The abrasion-free measurement of the bearing clearance can also be made on two or three sides and/or regions of the bearing. Accordingly a suitable number and/or combination of ring segments can be selected for the holder.

Preferably the holder, in particular at least one ring segment of the holder, is configured to be two-part, comprising a base body and a cover, wherein an interior is formed in the holder in which the at least one sensor is arranged. Preferably a seal, for example, a sealing cord is arranged between base body and cover. Further preferably the base body and the cover are screwed together.

A holder configured in two parts is particularly advantageous for a retrofitting solution for existing rudders. Rudder posts of existing rudders usually do not have a planar surface at the lower front side which is why no seal can be applied there. The sensor can be protected by the two-part configuration of the holder with a base body and a cover, wherein the at least one sensor is arranged in the interior of the holder.

In principle, the rudder post can also have a planar lower front side so that a seal can be attached there. In this case, the base body can be screwed against the lower front side of the trunk pipe so that the rudder post or the trunk pipe to a certain extent forms the cover of the holder.

Further preferably a sensor cable is provided, which is configured to conduct signals or data from the at least one sensor. The sensor cable can in particular be connected to a signal conducting means via a signal connection in order to transmit signals or data of the sensor to an evaluation unit.

The sensor cable is preferably arranged in the interior of the two-part holder. The arrangement of the sensor cable in the interior of the two-part holder is used to protect the sensor cable.

Preferably it can further be provided that the interior is filled with a grease, wherein the grease in particular surrounds the sensor cable. The arrangement of grease in the interior is used to protect the sensor cable from vibrations.

Preferably it can be provided that two, three or more sensors are provided per ring segment.

The ring segment can preferably be configured as approximately U-shaped.

Preferably it can be provided that a signal conducting means, in particular a cable is provided, wherein the signal conducting means is preferably arranged to run on an outer side of the trunk pipe.

Particularly preferably, the signal conducting means is electrically connected to the signal connection.

The signal conducting means, in particular the cable, serves to transmit signals or data from the at least one sensor to an evaluation unit, which particularly preferably is arranged inside the watercraft, for example, on the ship's bridge. Fundamentally it is also possible that cableless or wireless transmission of data is provided, wherein in this case the signal conducting means comprises a transmitter and/or a receiver for radio signals. Furthermore, in such a case the at least one sensor should be provided with a power source such as a battery, for example.

Preferably however, it is provided that the signal transmission takes place via a signal conducting means such as a cable.

Since the signal conducting means are arranged to run on an outer side of the trunk pipe, it is particularly easy to fasten or attach these to the trunk pipe.

It can further advantageously be provided that the signal conducting means is arranged, at least in sections, in a signal conducting means channel, wherein the signal conducting means channel is arranged on the outer side of the trunk pipe.

In this case, the signal conducting means channel is preferably only arranged on the outer side of the trunk pipe in sections.

In particular, the signal conducting means channel is only arranged in the region of a lower end of the trunk pipe which projects from the hull of the watercraft, in particular from a skeg of the watercraft and further in particular projects into the rudder blade of the rudder.

It can further preferably be provided that the signal conducting means channel is a groove, a U-profile or a cable channel.

A signal conducting means channel configured as a U-profile can be configured to be open towards the trunk pipe and welded on the trunk pipe with the ends of the U legs of the U profile so that the U profile together with the outer side of the trunk pipe forms a signal conducting means channel.

Furthermore, the signal conducting means channel can be configured as a groove incorporated in the outer side of the trunk pipe and optionally covered or a completely closed cable channel can be attached to the outer side of the trunk pipe.

The signal conducting means in the signal conducting means channel is further advantageously embedded in an insulating means, in particular in a grease.

By embedding the signal conducting means, in particular the cable, in an insulating means such as a grease, the signal conducting means, in particular the cable can be protected from vibrations and environmental influences.

A further solution of the object forming the basis of the invention consists in provided a method for measuring a bearing clearance in a rudder wherein an abrasion-free measurement of the bearing clearance is made.

The method according to the invention can in particular be executed in a previously described rudder.

In particular, all the advantages achieved with the previously described rudder can be achieved in a corresponding configuration for the method and the features of the previously described rudder, in particular the bearing clearance measuring device, can be transferred to the method in a suitable manner.

Preferably the abrasion-free measurement of the bearing clearance is an abrasion-free measurement of a distance between a sensor and a rudder shaft and/or an abrasion-free measurement of a wall thickness of a bearing bushing.

If the measured distance or the measured wall thickness lies outside pre-determined tolerance values, that is of the measured distance or the measured wall thickness is too large or too small, corresponding information can be displayed on an evaluation unit. The bearing or the bearing bushing can then be changed.

It can further be provided that the abrasion-free measurement is an ultrasound measurement, preferably using an ultrasound sensor, or an eddy current measurement, preferably using an eddy current sensor.

In addition, it can be provided that the measurement takes place automatically, in particular at regular time intervals.

As a result of the automatically implemented measurement, in particular made at regular time intervals, a continuous monitoring of the bearing clearance of a rudder can be provided. In particular, it is no longer necessary to determine the bearing clearance by a cost-intensive manual measurement by qualified divers under the water surface usually made at large time intervals.

Preferably it can be provided that the measurement is made at at least two, preferably at at least three, particularly preferably at at least four positions over a circumference of a bearing bushing and/or a rudder shaft and/or a trunk pipe.

Another solution of the object forming the basis of the invention consists in providing a bearing clearance measuring device, preferably for a previously described rudder and/or for a previously described method wherein the bearing clearance measuring device comprises at least one sensor for abrasion-free measurement of a bearing clearance.

The features explained in connection with the previously described rudder and method can also be transferred accordingly to the bearing clearance measuring device according to the invention.

Preferably the at least one sensor for abrasion-free measurement of a bearing clearance is a sensor for abrasion-free measurement of a distance between the sensor and a rudder shaft and/or for abrasion-free measurement of a wall thickness of a bearing bushing.

It is preferably provided that the at least one sensor is an eddy current sensor or an ultrasound sensor.

Another solution of the object forming the basis of the invention consists in the use of an eddy current sensor or an ultrasound sensor in a previously described method for measurement of a bearing clearance in a rudder, in particular in a previously described rudder.

BRIEF DESCRIPTION OF THE FIGURES

The present invention is explained in detail with reference to the appended figures.

In the figures:

FIG. 4 shows a trunk pipe with a bearing clearance measuring device with an ultrasound sensor, FIG. 5 shows a trunk pipe with an arrangement of four sensors of a bearing clearance measuring device.

DETAILED DESCRIPTION OF THE FIGURES

Figure 1:
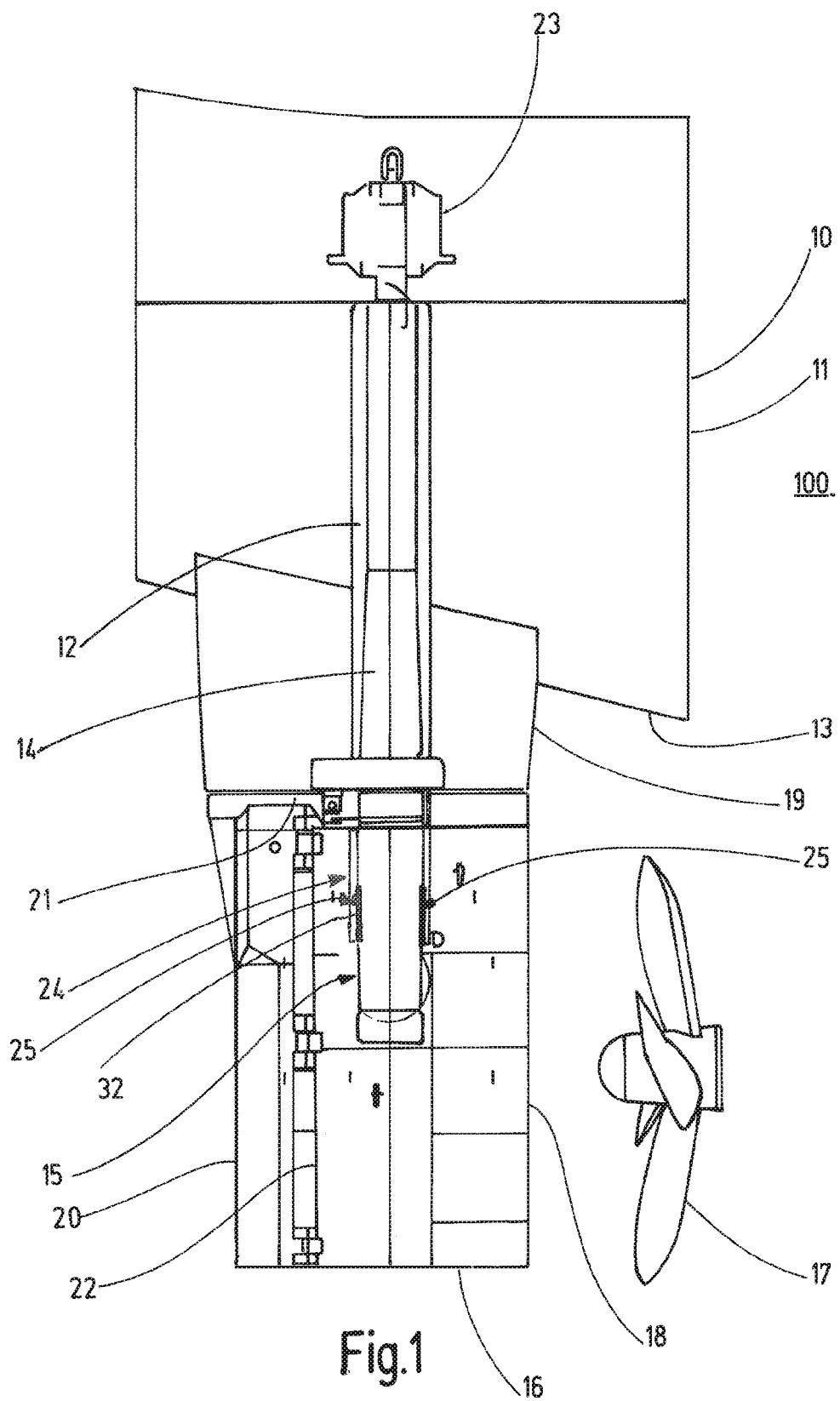
FIG. 1 shows a rudder on a watercraft.

FIG. 1 shows a rudder 100 on a watercraft 10 shown only in section in FIG. 1. The watercraft 10 is configured as a ship 11. The rudder 100 comprises a trunk pipe 12 which is fastened in a fixed manner in the hull 13 of the ship 11. A rudder shaft 14 is arranged rotatably in the trunk pipe 12. A rudder blade 16 of the rudder 100 is fastened at a lower end 15 of the rudder shaft 14. The rudder blade 16 is arranged behind a propeller 17 of the ship 11. The leading edge 18 of the rudder blade 16 is facing the propeller 17. Furthermore, a skeg 19 is arranged on the hull 13, through which the trunk pipe 12 and the rudder shaft 14 are guided. The lower end 15 of the rudder shaft 14 projects into the rudder blade 16. The rudder blade 16 further has a hinged fin 20 which is arranged pivotably by means of a linking device 21 on an end strip 22 of the rudder blade 16. The rudder blade 16 and the rudder shaft 14 are connected to a rudder system 23 in the hull 13, by means of which the rudder shaft 14 and the rudder blade 16 connected to the rudder shaft 14 can be pivoted. The trunk pipe 12 is also guided into the rudder blade 16 with a lower end 24. Located in the lower end 24 of the trunk pipe 12 is a bearing bushing 32 on which the rudder shaft 14 is mounted. Furthermore, the rudder 100 has a bearing clearance measuring device 25 shown in detail in FIGS. 2 to 8.

Figure 2:
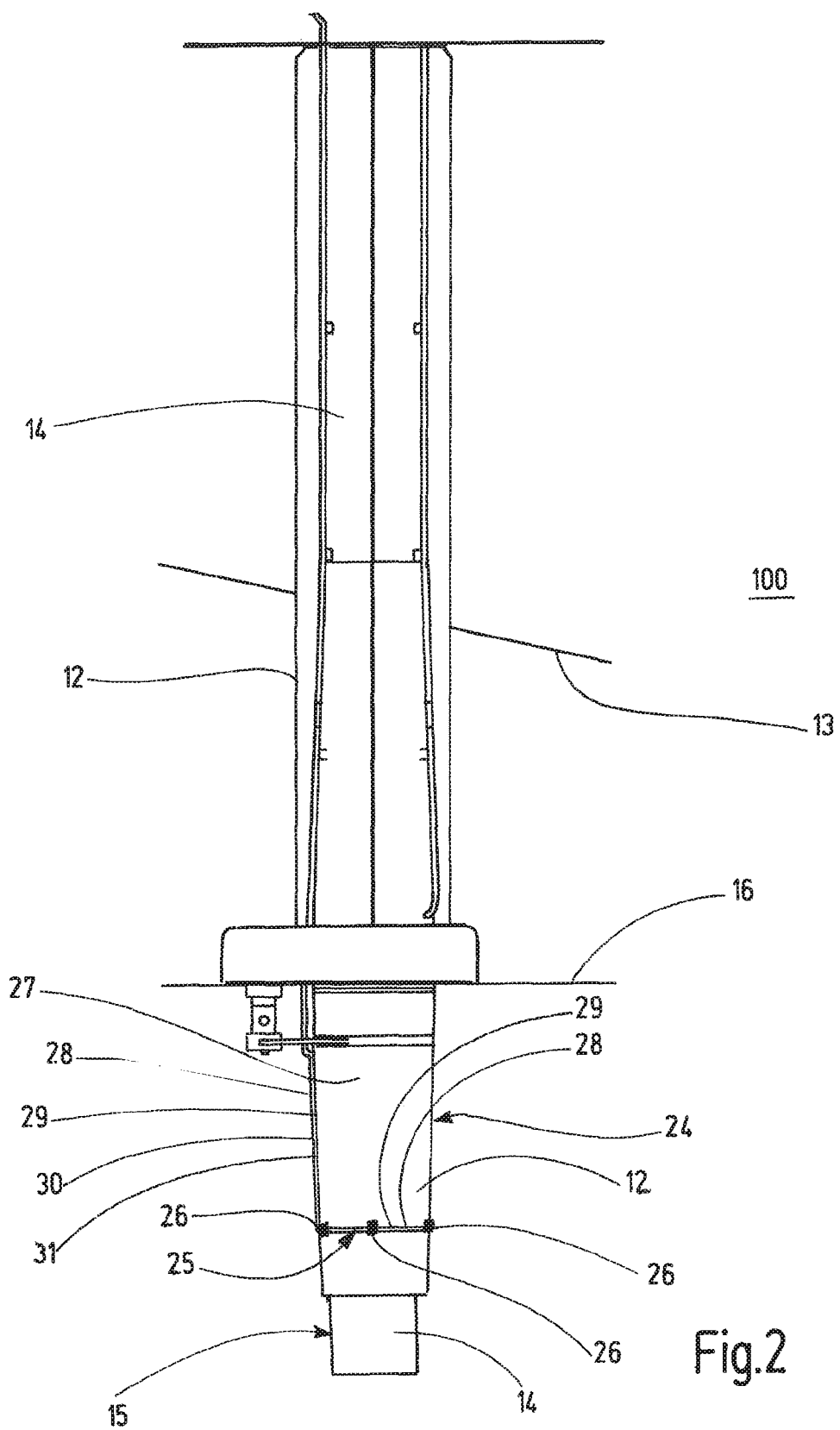
FIG. 2 shows a trunk pipe of a rudder with a rudder shaft and a bearing clearance measuring device.

FIG. 2 shows the trunk pipe 12, the rudder shaft 14 arranged in the trunk pipe 12 and the lower end 24 of the trunk pipe which is introduced into the rudder blade 16. The rudder shaft 14 or a lower end 15 of the rudder shaft 14 projects from the lower end 24 of the trunk pipe 12. The bearing clearance measuring device 25 has sensors 26 for abrasion-free measurement of a bearing clearance which are arranged over a circumference of the lower end 24 of the trunk pipe 12. The sensors 26 are connected to an evaluation unit not shown in detail and arranged in the hull 13 for data transmission via signal conducting means 28. In this case, the signal conducting means 28 are configured as cables 29 which are arranged to run on an outer side 27 of the trunk pipe 12. Located at the lower end 24 of the trunk pipe 12 is a signal conducting means channel 30 in which the cable 29 runs at least in some areas. The signal conducting means channel 30 is configured as a U profile 30 welded onto the outer side 27 of the trunk pipe 12 and filled with a grease. The cable 29 running in the U profile 31 is protected by the grease from vibrations and external and environmental influences.

Figure 3:
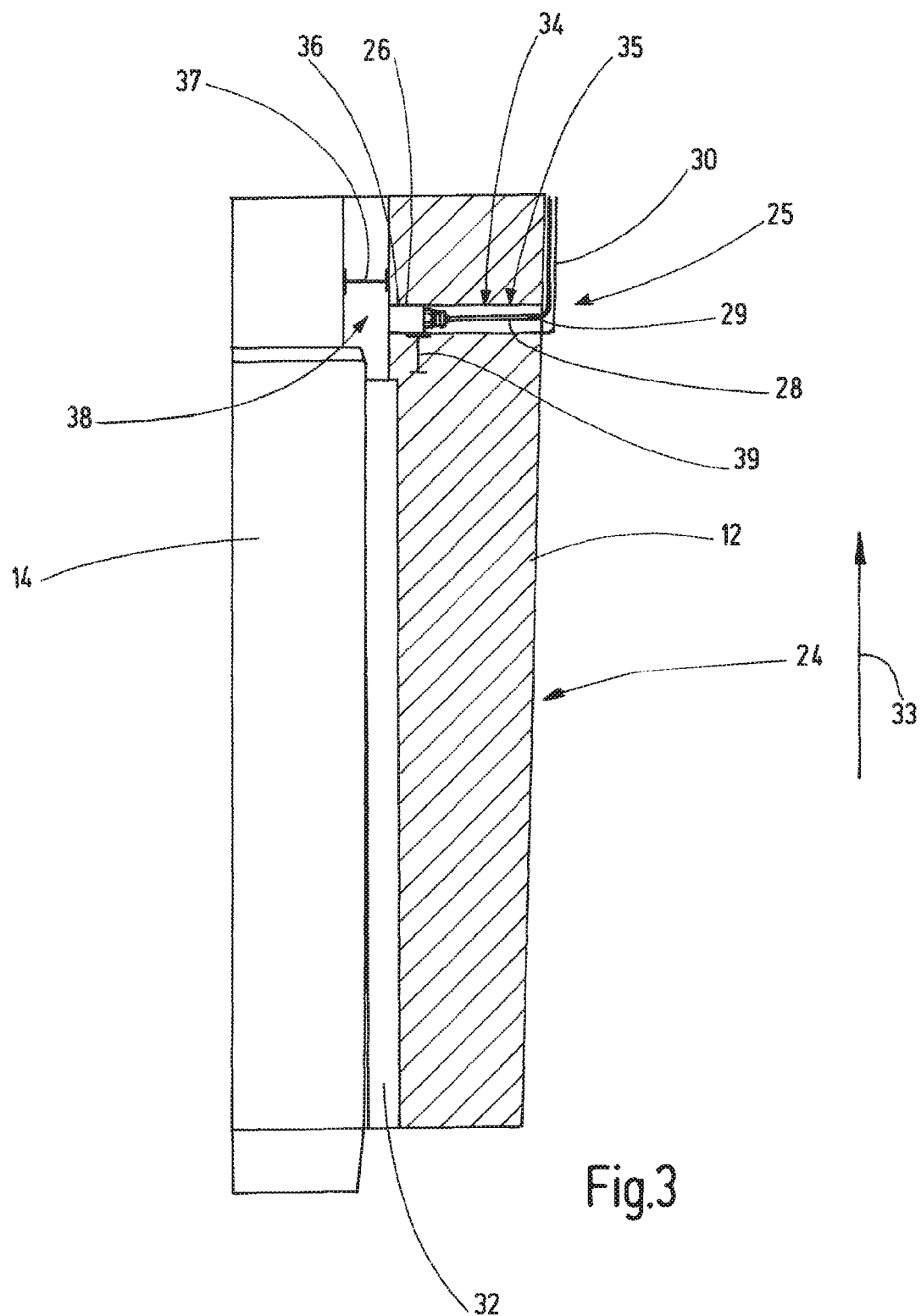
FIG. 3 shows a trunk pipe with a bearing clearance measuring device with an eddy current sensor.

FIG. 3 shows a cross-sectional view of the lower end 24 of the trunk pipe 12. The rudder shaft 14 of the rudder 100 is rotatably mounted in the trunk pipe 12 by means of a bearing bushing 32 fixed firmly on the trunk pipe 12. When viewed in an axial direction 33 of the rudder shaft 14, the at least one sensor 26 is arranged above the bearing bushing 32. The at least one sensor 26 is connected to the evaluation unit via the signal conducting means 28 configured as cable 29. The sensor 26 is arranged in a sensor receptacle 34 which is configured as a drilled hole 35 and is screwed in the sensor receptacle 34. The sensor 26 is configured as an eddy current sensor 36 and therefore has a coil not shown in detail. By applying an alternating current to the coil, a magnetic field is produced which induces an eddy current in the rudder shaft 14 formed opposite the eddy current sensor 36, through which a magnetic field is again induced. The induced magnetic field acts back on the coil of the eddy current sensor 36 and changes the impedance of the coil which can be measured as a change in the amplitude and the phase position of the coil of the eddy current sensor 36 and can be tapped as a measurable quantity. The distance 37 of the eddy current sensor 36 from the rudder shaft 14 can be determined from the change in the phase position or amplitude of the coil. Seawater or lubricants such as greases are located in the gap 38 between rudder shaft 14 and trunk pipe 12. Since the bearing bushing 32 is not located between the eddy current sensor 36 and the rudder shaft 14, the eddy current sensor 36 is arranged in a contact-free manner and at a distance from the rudder shaft 14. When viewed in the axial direction 33, the eddy current sensor 36 is arranged with a minimal distance 39 above the bearing bushing 32 so that the material of the bearing bushing 32 does not falsify the eddy current measurement of the eddy current sensor 36. The signal conducting means configured as cable 19 is guided in the signal conducting means channel 30.

FIG. 4 shows a further embodiment of a bearing clearance measuring device 25 for a rudder 100. The bearing clearance measuring device 25 of FIG. 4 also comprises a sensor 26 which is arranged in a sensor receptacle 34 of the trunk pipe 12. In contrast to the sensor 26 of FIG. 3, the sensor 26 of FIG. 4 is configured as an ultrasound sensor 40 and is arranged in a direct physical contact on an outer side 41 of the bearing bushing 32. A silicone-based ultrasound contact means 42 is arranged between the bearing bushing 32 arranged in particular in a fixed manner in the trunk pipe 12 and the ultrasound sensor 40. The ultrasound sensor 42 emits ultrasound waves which run through the material of the bearing bushing 32 and are reflected from the boundary surface 46 between bearing bushing 32 and rudder shaft 14. The wall thickness 43 of the bearing bushing 32 can be determined from the transit time of the ultrasound waves. In addition, the bearing clearance measuring device 25 of FIG. 4 is constructed identically to the bearing clearance measuring device 25 of FIG. 3.

FIG. 5 shows a cross-section through the trunk pipe 12 of FIG. 4 at the height of the bearing clearance measuring device 25. In the trunk pipe 12 four sensors 26 are arranged at uniform angular distances over the circumference of the trunk pipe 12. The rudder shaft 14 is mounted in the trunk pipe 21 via a bearing bushing 32. One sensor 26a of the sensors 26 is arranged exactly astern on the trunk pipe 12 contrary to the direction of travel 44 of the watercraft 10. The angular spacings of the sensors 26 are 90° with respect to one another in each case.

Figure 6:
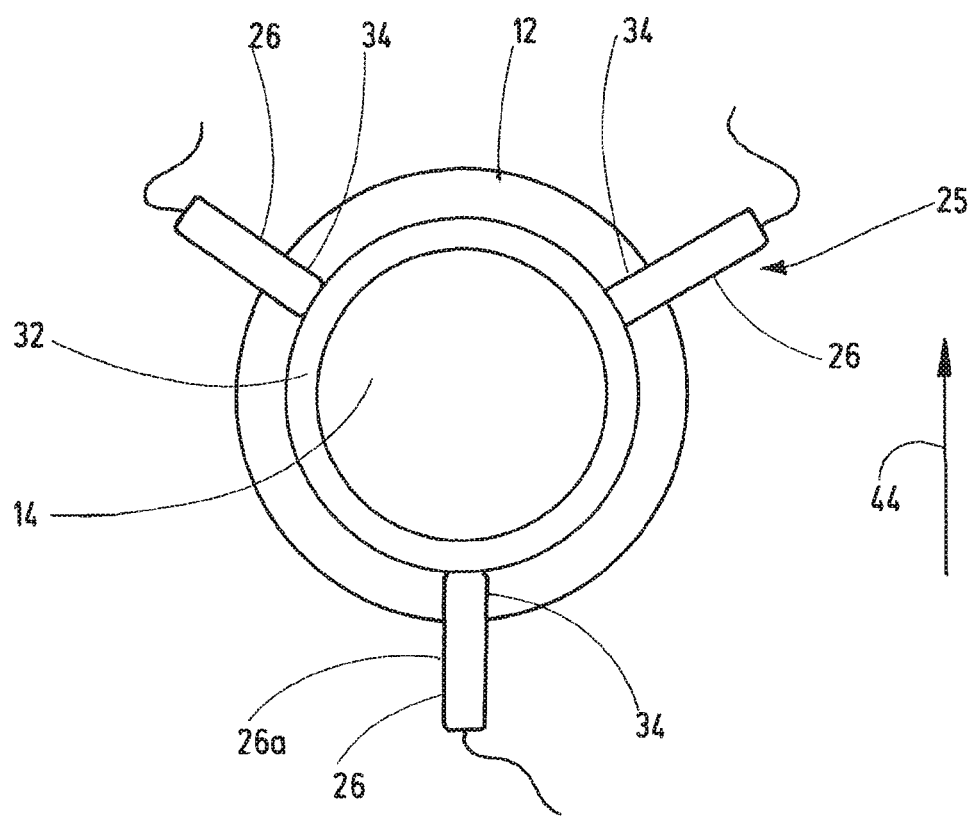
FIG. 6 shows a trunk pipe with an arrangement of three sensors of a bearing clearance measuring device.

FIG. 6 shows an alternative arrangement of the sensors 26, 26a of the bearing clearance measuring device 25. Compared to FIG. 5 three sensors 26 are provided which are arranged in sensor receptacles 34. The three sensors 26, 26a are arranged at uniform angular distances over the circumference of the trunk pipe 12. The angular distances between the individual sensors 26, 26a are 120°. In the configuration according to FIG. 6, a sensor 26a is fastened exactly contrary to the direction of travel 44 astern on the trunk pipe 12.

Figure 7:
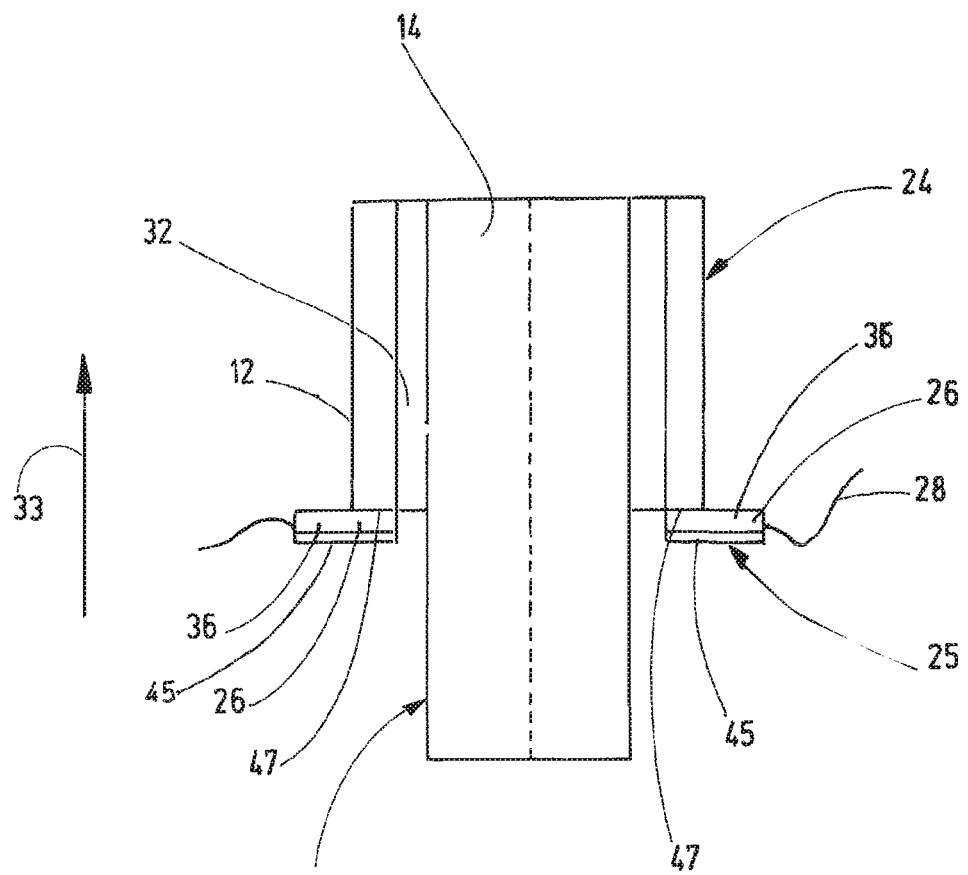
FIG. 7 shows a bearing clearance measuring device on a front side of a trunk pipe.

FIG. 7 shows a further configuration of the bearing clearance measuring device 25 with eddy current sensors 36. The eddy current sensors 36 are arranged on an annular holder 45. The annular holder 45 is arranged on a front side 47 of the lower end 24 of the trunk pipe 12. Thus, when viewed in the axial direction 33 of the rudder shaft 14, the eddy current sensors 36 are located underneath the bearing bushing 32. Furthermore, the configuration according to FIG. 7 is similar to the configuration according to FIG. 3.

Figure 8:
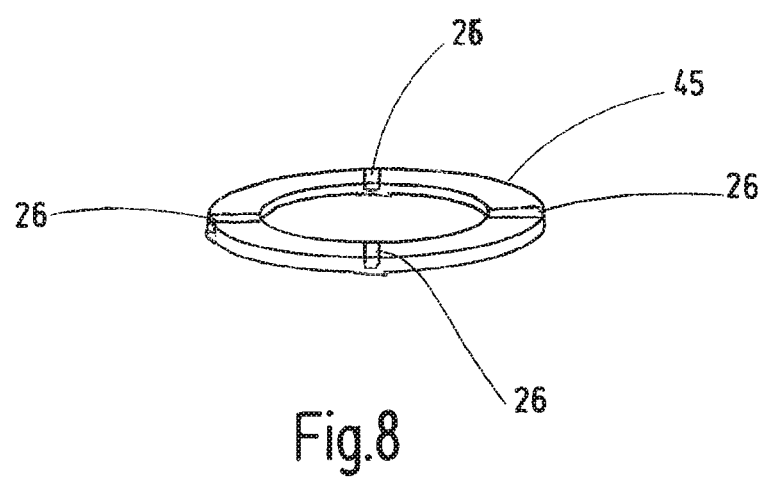
FIG. 8 shows a holder with sensors of a bearing clearance measuring device.

FIG. 8 finally shows a perspective view of the annular holder 45 with four sensors 26 arranged at regular angular distances thereon.

Figure 9:
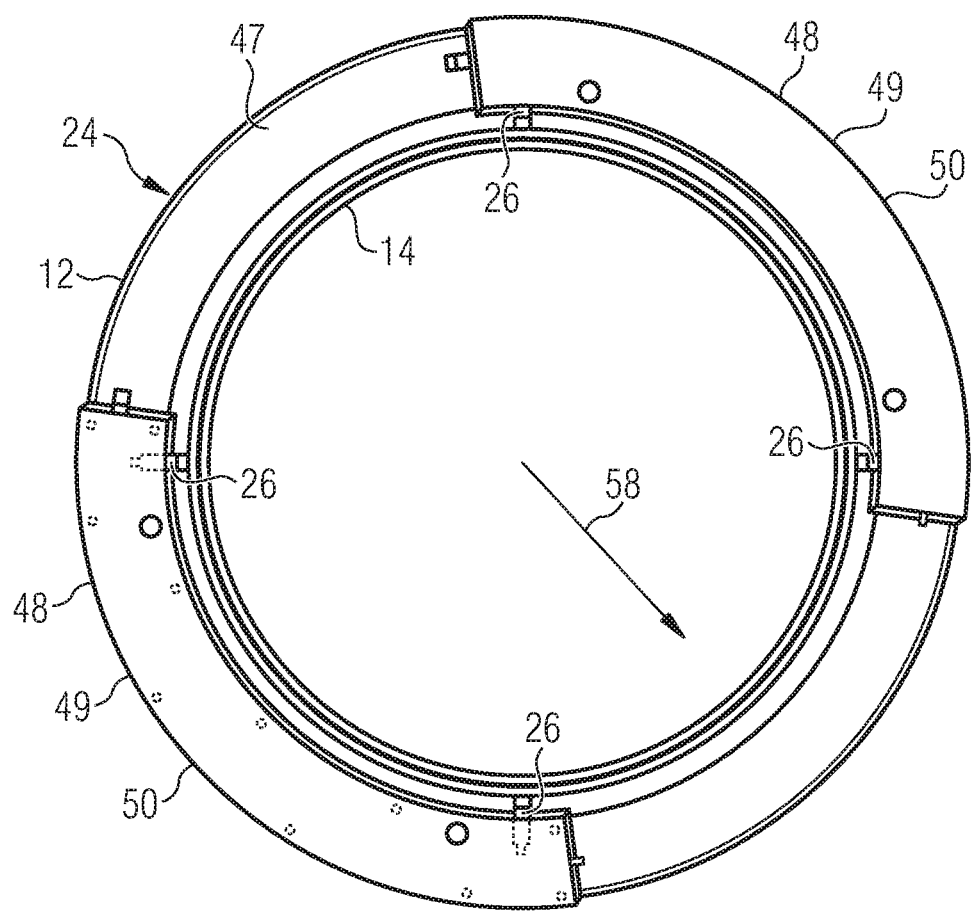
FIG. 9 shows a holder with ring segments on a front side of a trunk pipe.

FIG. 9 shows in a plan view of the front side 47 of the lower end 24 of the trunk pipe 12, a further holder 48 which is arranged on the front side 47 of the trunk pipe 12. The holder 48 comprises two ring segments 50 configured as quarter rings 49. Each of the ring segments 50 covers an angular region of somewhat more than 90°. Each ring segment 50 has two sensors 26 which can be configured as eddy current sensors 36. The sensors 26 of each ring segment 50 are arranged at an angular distance of 90° with respect to one another. The configuration shown in FIG. 9 with two ring segments 50 configured as quarter rings 49 is particularly suitable as a retrofitting solution for an existing rudder 100 with existing rudder shafts 14.

Figure 10:
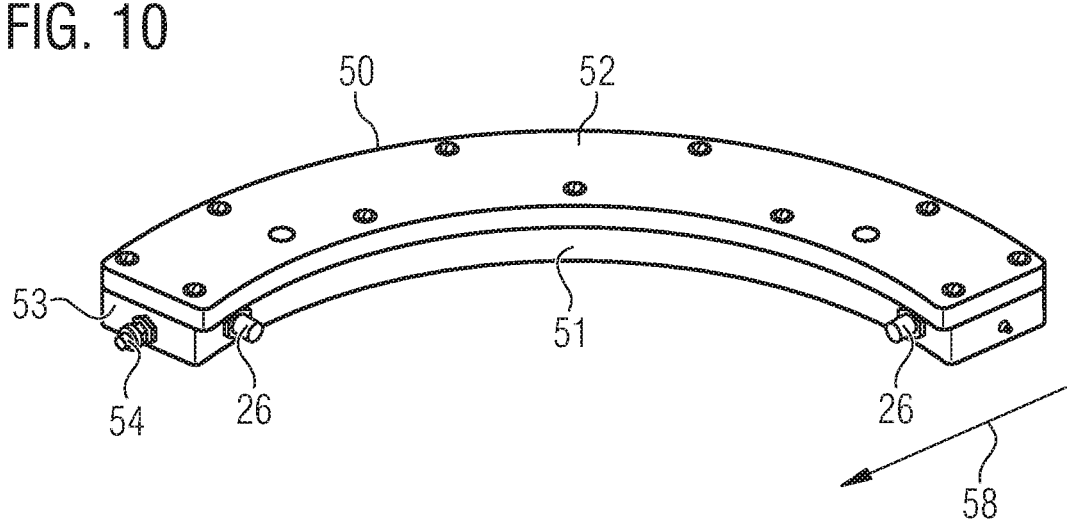
FIG. 10 shows a ring segment of a holder.

A single ring segment 50 from FIG. 9 is shown in FIG. 10. The ring segment 50 is formed in two parts and has a base body 51 and a cover 52. The cover 52 is screwed to the base body 51. At an angular distance of about 90°, two sensors 26 for abrasion-free measurement of a bearing clearance project inwards in a radial direction 58 from the ring segment 50. A signal connection 54 is provided on one of the front sides 53 of the ring segment 50 via which the signals and data of the two sensors 26 can be guided out from the ring segment 50. Signal conducting means 28 (FIG. 2) can be connected to the signal connection 54, by means of which the signals and data of the sensors 26 can be conducted to an evaluation unit.

Figure 11:
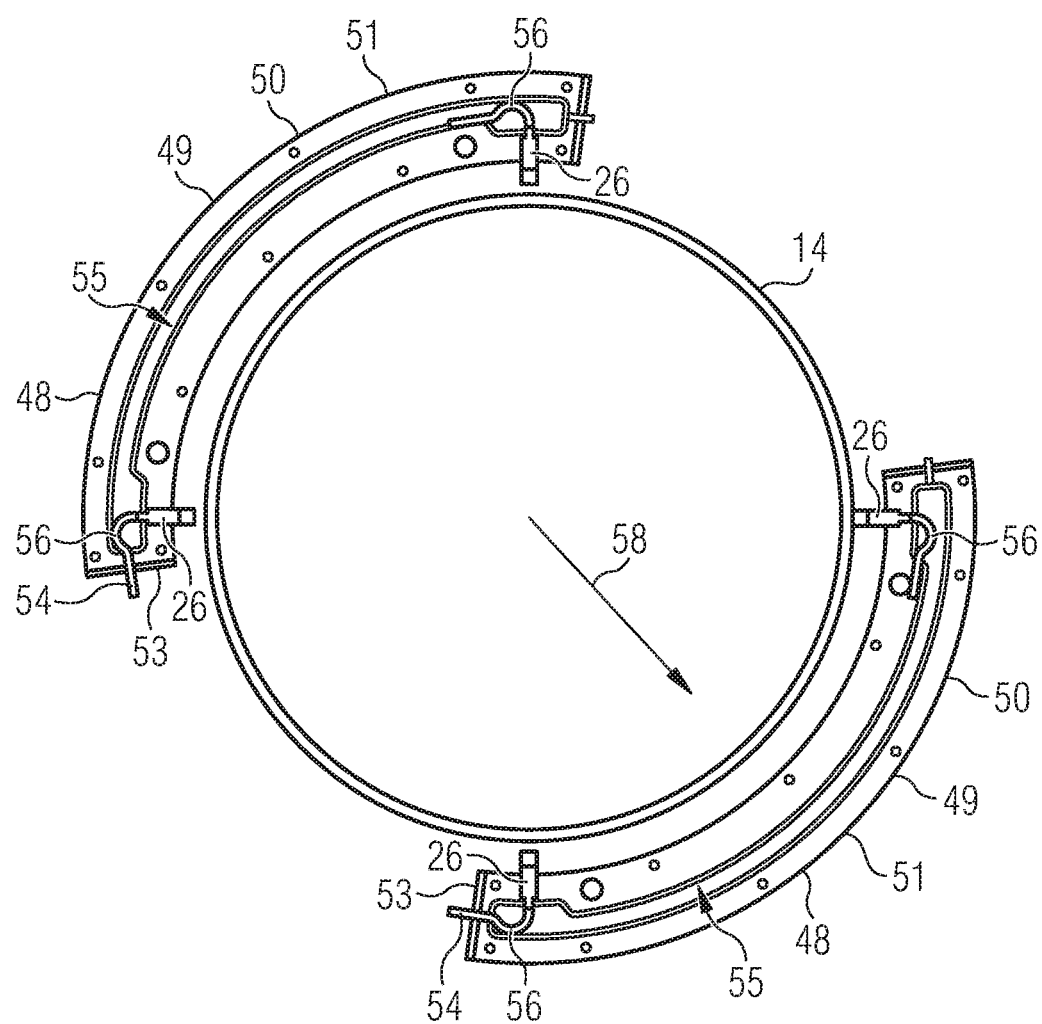
FIG. 11 shows a holder with ring segments.

FIG. 11 shows in a plan view the holder 48 with the two ring segments 50 according to FIG. 9 but without the trunk pipe 12. Both ring segments 50 have a base body 51 according to FIG. 10. The ring segments 50 are shown without the respective cover 52. Each of the ring segments 50 has an interior 55 in which the sensors 26 are at least partially arranged. Each of the sensors 26 is connected to a sensor cable 56 which guides the signals and data of the sensors 26 to the signal connection 54 on the front side 53 of the respective ring segment 50. The interior 55 of the ring segments 50 is filled with grease in order to protect the sensor cables 56 from vibrations.

Figure 12A:
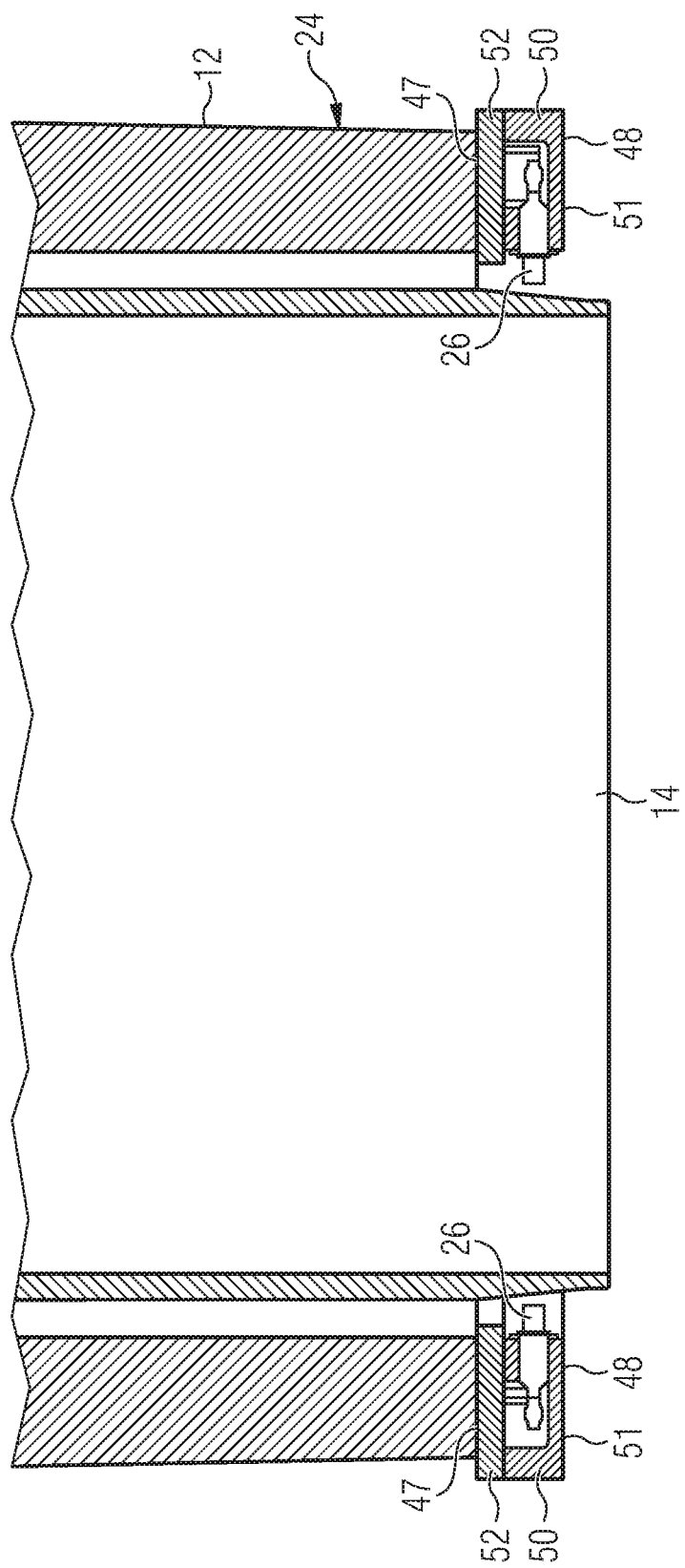
FIG. 12a shows a side view of a holder with ring segments on a front side of a trunk pipe.
Figure 12B:
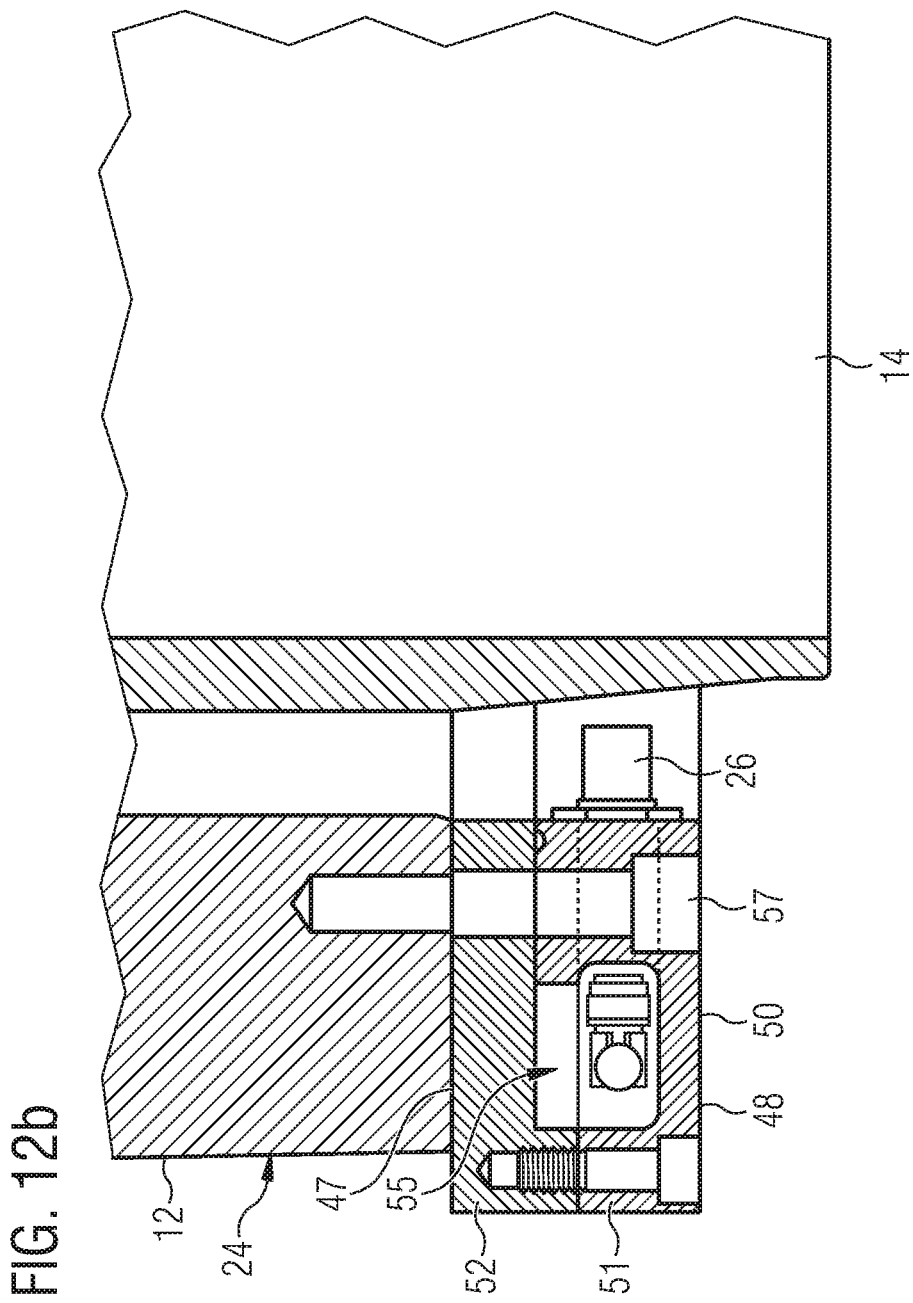
FIG. 12b shows a detailed view of a holder with ring segments on a front side of a trunk pipe and FIG. 13 shows U-shaped holder.

FIGS. 12a and 12b show a side view of the lower end 24 of the trunk pipe 12 similar to FIG. 7. FIG. 12b is a detailed view of FIG. 12a. The ring segments 50 of the holder 48 are arranged on the front side 47 of the lower end 24 of the trunk pipe 12. The sensors 26 project from the interior 55 of the respective ring segment 50 for abrasion-free measurement of the bearing clearance. As is shown in particular in FIG. 12b, the ring segments 50 are screwed to the front side 47 of the trunk pipe 12 by means of connecting screws 57. Each ring segment 50 has a base body 51 and a cover 52.

Figure 13:
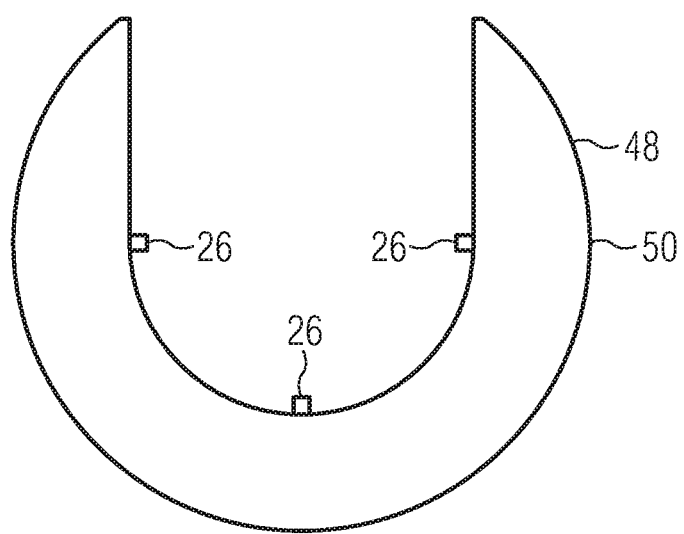

FIG. 13 shows a further configuration of the holder 48 in a plan view. The holder 48 is configured as an approximately U-shaped ring segment 50. The ring segment 50 comprises sensors 26 for abrasion-free measurement of the bearing clearance.

The invention claimed is:

1. A rudder for watercraft, in particular for ships, comprising a rudder shaft arranged in a trunk pipe, a rudder blade connected to the rudder shaft and a bearing bushing arranged between trunk pipe and rudder shaft as well as a bearing clearance measuring device, wherein the bearing clearance measuring device comprises at least one sensor for abrasion-free measurement of a bearing clearance.

2. The rudder according to claim 1, wherein the at least one sensor for abrasion-free measurement of a bearing clearance is a sensor for abrasion-free measurement of a distance between the sensor and the rudder shaft and/or for abrasion-free measurement of a wall thickness of the bearing bushing.

3. The rudder according to claim 1, wherein the sensor is arranged in a contact-free manner and at a distance from the rudder shaft.

4. The rudder according to claim 1, wherein the sensor is arranged on an outer side of the bearing bushing, and/or that the at least one sensor is arranged above or below the bearing bushing when viewed in an axial direction of the rudder shaft.

5. The rudder according to claim 1, wherein at least two, preferably at least three, particularly preferably at least four sensors are provided, wherein the sensors are arranged in particular at regular angular spacings over a circumference of the trunk pipe and/or the bearing bushing and/or that the at least one sensor, in particular at least one of the sensors is arranged in an aft region of the in particular fixed trunk pipe.

6. The rudder according to claim 1, wherein the at least one sensor is arranged in a sensor receptacle, in particular in a drill hole, of the trunk pipe and is preferably is screwed in or to the trunk pipe.

7. The rudder according to claim 1, wherein the at least one sensor is an eddy current sensor or an ultrasound sensor.

8. The rudder according to claim 7, wherein an ultrasound contact means, in particular silicone-based, is arranged between the ultrasound sensor and the bearing bushing and/or the rudder shaft.

9. The rudder according to claim 1, wherein a signal conducting means, in particular a cable, is provided, wherein the signal conducting means is preferably arranged to run on an outer side of the trunk pipe, wherein the signal conducting means is particularly preferably arranged, at least in sections, in a signal conducting means channel, wherein the signal conducting means channel is arranged on the outer side of the trunk pipe, wherein quite particularly preferably the signal conducting means channel is a groove, a U-profile or a cable channel.

10. A method for measuring a bearing clearance in a rudder, wherein an abrasion-free measurement of the bearing clearance is made.

11. The method according to claim 10, wherein the abrasion-free measurement of the bearing clearance is an abrasion-free measurement of a distance between a sensor and a rudder shaft and/or an abrasion-free measurement of a wall thickness of a bearing bushing and/or the abrasion-free measurement is an ultrasound measurement, preferably using an ultrasound sensor, or an eddy current measurement, preferably using an eddy current sensor.

12. The method according to claim 10, wherein the measurement is made automatically, in particular at regular time intervals, and/or that the measurement is made at at least two, preferably at at least three, particularly preferably at at least four positions over a circumference of a bearing bushing and/or a rudder shaft and/or a trunk pipe.

13. A bearing clearance measuring device for a rudder, wherein the bearing clearance measuring device comprises at least one sensor for abrasion-free measurement of a bearing clearance, wherein preferably the at least one sensor for abrasion-free measurement of a bearing clearance is a sensor for abrasion-free measurement of a distance between the sensor and a rudder shaft and/or for abrasion-free measurement of a wall thickness of a bearing bushing.

14. The bearing clearance measuring device according to claim 13, wherein the at least one sensor is an eddy current sensor or an ultrasound sensor.

* * * * *